(12) United States Patent
Noda

(10) Patent No.: US 7,928,687 B2
(45) Date of Patent: Apr. 19, 2011

(54) CHARGING CIRCUIT, METHOD OF CONTROLLING OPERATION OF CHARGING CIRCUIT, AND POWER SUPPLY UNIT

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 824 days.

(21) Appl. No.: 11/806,511

(22) Filed: May 31, 2007

(65) Prior Publication Data
US 2008/0007227 A1    Jan. 10, 2008

(30) Foreign Application Priority Data

Jun. 6, 2006  (JP) ................................ 2006-157435

(51) Int. Cl.
*H02J 7/00*  (2006.01)
*H01M 10/44*  (2006.01)
*H01M 10/46*  (2006.01)

(52) U.S. Cl. ........ 320/101; 320/137; 320/138; 320/160; 320/161; 320/162

(58) Field of Classification Search .................. 320/101, 320/103, 137, 138, 160–165
See application file for complete search history.

(56) References Cited

U.S. PATENT DOCUMENTS

| | | | |
|---|---|---|---|
| 5,172,044 A * | 12/1992 | Sasaki et al. | 320/160 |
| 5,637,981 A * | 6/1997 | Nagai et al. | 320/160 |
| 5,734,205 A * | 3/1998 | Okamura et al. | 307/110 |
| 5,926,661 A | 7/1999 | Maeno | |
| 6,124,700 A * | 9/2000 | Nagai et al. | 320/132 |
| 7,372,236 B2 | 5/2008 | Kobayashi | |
| 2004/0090209 A1* | 5/2004 | Nishida et al. | 320/149 |
| 2005/0206342 A1* | 9/2005 | Aleyraz et al. | 320/101 |
| 2006/0029846 A1* | 2/2006 | Konoto et al. | 429/23 |
| 2007/0001513 A1 | 1/2007 | Noda | |

FOREIGN PATENT DOCUMENTS

| | | |
|---|---|---|
| JP | 10-170983 | 6/1998 |
| JP | 2002-084665 A | 3/2002 |
| JP | 2004-227805 | 8/2004 |
| WO | WO 2005/050813 A1 | 6/2005 |

OTHER PUBLICATIONS

Machine translation of the JP office action.*

* cited by examiner

*Primary Examiner* — Edward Tso
*Assistant Examiner* — Samuel Berhanu
(74) *Attorney, Agent, or Firm* — Dickstein Shapiro LLP

(57) ABSTRACT

A charging current for a secondary battery is reduced when the secondary battery voltage gets close to a previously set constant voltage. When the charging current has become less than a charging completion current value as a reference for determining whether the charging has been completed, a charging control sequence circuit determines that the charging of the secondary battery has been completed and proceeds to a first flow consumption current mode. The charging control sequence circuit turns off a first switch to cut off an electrical connection to stop the operation of the charging control circuit, whereby a switching element and a switching element for synchronous rectification are turned off to cut-off electrical connections so that the charging current becomes 0 mA.

5 Claims, 10 Drawing Sheets

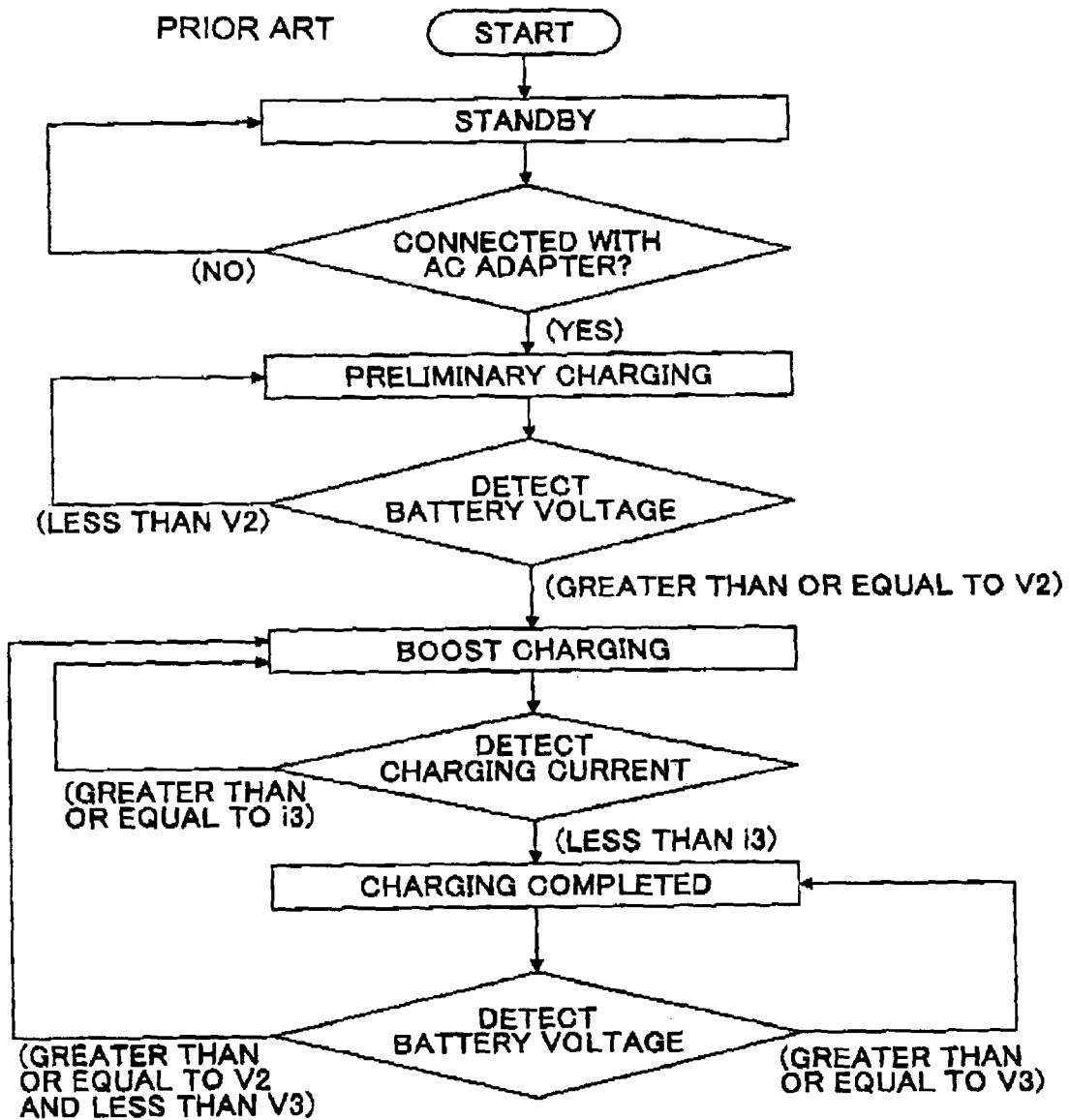

CHARGING CIRCUIT, METHOD OF CONTROLLING OPERATION OF CHARGING CIRCUIT, AND POWER SUPPLY UNIT

BACKGROUND OF THE INVENTION

1. Field of the Invention

The present invention relates to charging circuits of secondary batteries for use in small mobile electronic devices such as mobile phones and notebook computers, a method of controlling the operation of the charging circuits, and power supply units and, in particular, to a charging circuit of a secondary battery which charges the secondary battery using an energy-limited fuel cell as a power supply, a method of controlling the operation of the charging circuit, and a power supply unit.

2. Description of the Related Art

Recently, there has been a growing interest in the global environment and energy, and in such a circumstance, fuel cells having a low environmental impact have been adopted as a power supply for mobile devices. With mobile phones in particular, it can easily be predicted that, as a result of the introduction of digital terrestrial broadcasting and next-generation communication standards, the standby time of mobile phones will be shortened due to a more-than-ever increase in the electric power consumption of the devices. With respect to notebook computers, the extension of their continuous operating time is hoped for and the adoption of batteries having a high energy density will be necessary along with the low power consumption of the devices.

Although fuel cells have a high energy density, their generated voltages per cell are generally low, ranging from 0.3 V to 1.23 V. Generally, it is not possible to drive a load with such low voltages. Furthermore, since fuel cells have an extremely low power density, they are available in the so-called hybrid composition which boosts a generated voltage with a voltage boosting circuit, stores the generated energy in secondary batteries having a high power density connected parallel to a load, and supplies power from the secondary batteries to the load. The transfer of electricity from the fuel cells to the secondary batteries is performed through a charging circuit.

FIG. 10 is a flowchart exemplifying a method of controlling charging of a typical charging circuit which charges a lithium-ion battery using an AC adapter. Referring now to FIG. 10, a description will be made about a method of controlling the charging of the typical charging circuit.

In FIG. 10, when a charging circuit is connected to an AC adapter having a lithium-ion battery mounted thereon, the process proceeds from standby to preliminary charging. Furthermore, when the voltage of the lithium-ion battery rises, the process then proceeds from the preliminary charging to boost charging. Generally, the boost charging performs the so-called constant current and constant voltage charging which is controlled to charge with a constant current value and with a constant voltage, respectively, so as not to exceed the rated voltage of the lithium-ion battery.

When the voltage of the lithium-ion battery gets close to a previously set constant voltage, the charging current is reduced. When the charging current has become less than a predetermined charging completion current value i3 to detect a full charge, it is determined that the charging has been completed, and the charging current is controlled to become 0 mA. In the charging completed state, the lithium-ion battery is discharged by the operation of the device, and when the voltage of the lithium-ion battery is reduced, the boost charging is started again. At this time, the charging control circuit of the charging circuit monitors the voltage of the lithium-ion battery in preparation for the recharging, and the function constituting the charging circuit also operates.

Note that, in a separate invention, there is provided a mobile electronic device having a power supply unit which uses a fuel cell capable of lengthening the available operating time of the device until refueling and also preventing the device and the user from being damaged/injured in case of suddenly running out of fuel. Reference is made to JP-A-2004-227805, for example.

With the typical method as shown in FIG. 10, the charging control circuit of the charging circuit still operates even in the charging completed state where no charging is performed, resulting in the consumption of scarce current. However, since an AC adapter can supply nearly unlimited electric power, it is not necessary to stop the charging control circuit. When a fuel cell is used instead of an AC adapter, on the other hand, it has a limited energy supply. Therefore, in a case where the charging control circuit operates even at the time when no charging is performed, scarce current is supplied to the charging control circuit, thereby shortening the available operating time of the fuel cell. Furthermore, when a fuel cell is used for a mobile device, the standby time of the mobile device becomes shortened.

SUMMARY OF THE INVENTION

It is an object of the present invention to provide a charging circuit which charges a secondary battery using a fuel cell as a power supply, a method of controlling the operation of the charging circuit, and a power supply unit, which are capable of greatly improving power efficiency by proceeding to a low consumption current mode in which consumption of scarce current can be reduced when the charging of the secondary battery is completed.

According to a first aspect of the present invention, there is provided a charging circuit which charges a secondary battery using a fuel cell as a power supply. The charging circuit comprises: a charging current supply circuit unit which supplies a charging current to the secondary battery using the fuel cell as the power supply depending on an input control signal; a charging current detection circuit unit which detects the charging current value output from the charging current supply circuit unit, and generates and outputs a signal indicative of the detected charging current value; a secondary battery voltage detection circuit unit which detects the voltage of the secondary battery, and generates and outputs a signal indicative of the voltage value of the detected secondary battery voltage; and a charging control circuit unit which performs on the charging current supply circuit unit either constant-current charging for outputting a predetermined charging current or constant-voltage charging for outputting a charging current so that the secondary battery voltage becomes constant at a predetermined value, based on the respective output signals output from the charging current detection circuit unit and the secondary battery voltage detection circuit unit. When the charging control circuit unit determines from the output signal output from the charging current detection circuit unit that the charging of the secondary battery has been completed, it interrupts the power supply to an internal circuit which controls the operation of the charging current supply circuit unit.

Further, when the charging control circuit unit determines from the output signal output from the secondary battery voltage detection circuit unit to restart the charging of the secondary battery, it starts the power supply to the internal circuit which controls the operation of the charging current supply circuit unit.

Specifically, the charging control circuit unit includes: a charging control circuit which serves as the internal circuit and performs on the secondary battery either the constant-current charging or the constant-voltage charging using the charging current supply circuit unit depending on an input control signal; a first switch circuit which performs the control of a power supply to the charging control circuit depending on an input control signal; and a control circuit which performs the control of the operation of the charging control circuit and the first switch circuit based on the respective output signals output from the charging current detection circuit unit and the secondary battery voltage detection circuit unit. When the control circuit detects from the output signal output from the charging current detection circuit unit that the charging current value has become less than a predetermined charging completion current value, it determines that charging of the secondary battery has been completed, and causes the first switch circuit to interrupt a power supply to the charging control circuit.

Further, when the control circuit detects from the output signal output from the secondary battery voltage detection circuit unit that a secondary battery voltage has become less than a predetermined voltage value, it determines to start the charging of the secondary battery and causes the first switch circuit to perform the power supply to the charging control circuit.

The charging circuit further comprises: a fuel cell voltage detection circuit unit which detects a fuel cell voltage as a voltage of the fuel cell; and a second switch circuit which performs the control of the power supply to the charging current detection circuit unit depending on an input control signal. When the fuel cell voltage detection circuit unit detects that the fuel cell voltage has become less than a predetermined specified voltage value, it causes the first switch circuit to interrupt the power supply to the charging control circuit and the second switch circuit to interrupt the power supply to the charging current detection circuit unit.

Further, when the fuel cell voltage detection circuit unit detects that the fuel cell voltage has become greater than or equal to the specified voltage value, it causes the first switch circuit to perform the power supply to the charging control circuit and the second switch circuit to perform the power supply to the charging current detection circuit unit.

The charging circuit further comprises a temperature sensing circuit unit which senses the temperature of the fuel cell. When the temperature sensing circuit unit senses that the temperature of the fuel cell has become greater than or equal to a predetermined value, it causes the first switch circuit to interrupt the power supply to the charging control circuit and the second switch circuit to interrupt the power supply to the charging current detection circuit unit.

The charging circuit further comprises: a temperature sensing circuit unit which senses the temperature of the fuel cell; and a second switch circuit which controls the power supply to the charging current detection circuit unit depending on an input control signal. When the temperature sensing circuit unit senses that the temperature of the fuel cell has become greater than or equal to a predetermined value, it causes the first switch to interrupt the power supply to the charging control circuit and the second switch circuit to interrupt a power supply to the charging current detection circuit unit.

In this case, when the temperature sensing circuit unit senses that the temperature of the fuel cell has become less than the predetermined value, it causes the first switch circuit to connect the power supply to the charging control circuit and the second switch circuit to connect the power supply to the charging current detection circuit unit.

Specifically, the charging current supply circuit unit boosts the fuel cell voltage as the voltage of the fuel cell, and applies the boosted voltage to the secondary battery depending on the control signal from the charging control circuit.

Further, the charging current supply circuit unit may reduce the fuel cell voltage as the voltage of the fuel cell, and apply the reduced voltage to the secondary battery depending on the control signal from the charging control circuit.

Further, the charging current supply circuit unit may include a transistor circuit which performs a switching operation for supplying a charging current from the fuel cell to the secondary battery depending on the control signal from the charging control circuit and the transistor circuit, the charging current detection circuit unit, the secondary battery voltage detection circuit unit, and the charging control circuit unit may be integrated into one integrated circuit.

Further, the secondary battery is a lithium-ion battery or an electric double layer capacitor.

According to another aspect of the present invention, there is provided a method of controlling the operation of a charging circuit which charges a secondary battery using a fuel cell as a power supply. The method comprises the step of: interrupting the power supply to a circuit which drives and controls the circuit for supplying a charging current to the secondary battery so as to stop supplying the charging current to the secondary battery upon completion of charging the secondary battery.

Specifically, the method further comprises the steps of: determining that the charging of the secondary battery has been completed when the charging current passing through the secondary battery is detected to have become less than the charging completion current value previously set for determining the completion of charging the secondary battery.

Further, the method further comprises the step of: interrupting the power supply to a circuit which drives and controls a circuit for detecting the charging current and a circuit for supplying the charging current when the fuel cell voltage as the voltage of the fuel cell has been detected to be less than a predetermined specified voltage value.

Further, the method further comprises the step of: interrupting the power supply to the circuit which drives and controls the circuit for detecting the charging current and the circuit for supplying the charging current when a temperature of the fuel cell has been detected to be greater than or equal to a predetermined value.

According to still another aspect of the present invention, there is provided a power supply unit which charges a secondary battery and supplies a voltage of the secondary battery to a load. The power supply unit comprises: a fuel cell; and a charging circuit which charges the secondary battery using the fuel cell as a power supply. The charging circuit includes: a charging current supply circuit unit which supplies a charging current to the secondary battery using the fuel cell as a power supply depending on an input control signal; a charging current detection circuit unit which detects the charging current value output from the charging current supply circuit unit, and generates and outputs a signal indicative of the detected charging current value; a secondary battery voltage detection circuit unit which detects the voltage of the secondary battery, and generates and outputs a signal indicative of the voltage value of the detected secondary battery voltage; and a charging control circuit unit which performs on a charging current supply circuit unit one of constant-current charging for outputting a predetermined charging current and constant-voltage charging for outputting a charging current so that the secondary battery voltage becomes constant at a predetermined value, based on the respective signals output from the charging current detection circuit unit and the secondary battery voltage detection circuit unit. When the charging control circuit unit determines from the output signal output from the charging current detection circuit unit that charging of the secondary battery has been completed, it interrupts a power supply to an internal circuit which controls the operation of the charging current supply circuit unit.

Specifically, the charging control circuit unit includes: a charging control circuit which serves as the internal circuit and performs one of the constant-current charging and the constant-voltage charging on the secondary battery using the charging current supply circuit unit depending on an input control signal; a first switch circuit which performs the control of the power supply to the charging control circuit depending on an input control signal; and a control circuit which performs the control of the operation of the charging control circuit and the first switch circuit based on the respective signals output from the charging current detection circuit unit and the secondary battery voltage detection circuit unit. When the control circuit detects from the output signal output from the charging current detection circuit unit that the charging current value has becomes less than a predetermined charging completion current value, it determines that the charging of the secondary battery has been completed, and causes the first switch circuit to interrupt the power supply to the charging control circuit.

Further, when the control circuit detects from the output signal output from the secondary battery voltage detection circuit unit that the secondary battery voltage has become less than a predetermined voltage value, the control circuit determines to start the charging of the secondary battery and causes the first switch circuit to connect the power supply to the charging control circuit.

The power supply unit further comprises: a fuel cell voltage detection circuit unit which detects a fuel cell voltage as a voltage of the fuel cell; and a second switch circuit which performs the control of the power supply to the charging current detection circuit unit depending on an input control signal. When the fuel cell voltage detection circuit unit detects that the fuel cell voltage has become less than a predetermined specified voltage value, it causes the first switch to interrupt the power supply to the charging control circuit and the second switch to interrupt the power supply to the charging current detection circuit unit.

The power supply unit further comprises: a temperature sensing circuit unit which senses a temperature of the fuel cell. When the temperature sensing circuit unit senses that the temperature of the fuel cell has become greater than or equal to a predetermined value, it causes the first switch circuit to interrupt the power supply to the charging control circuit and the second switch circuit to interrupt the power supply to the charging current detection circuit unit.

Further, the power supply unit further comprises: a temperature sensing circuit unit which senses a temperature of the fuel cell; and a second switch circuit which controls the power supply to the charging current detection circuit unit depending on an input control signal. When the temperature sensing circuit unit senses that the temperature of the fuel cell has become greater than or equal to a predetermined value, it causes the first switch circuit to interrupt the power supply to the charging control circuit and the second switch circuit to interrupt the power supply to the charging current detection circuit unit.

According to a charging circuit, a method of controlling the operation of the charging circuit, and a power supply unit of the present invention, when a charging current is controlled so as not to pass through in cases where electric power cannot be supplied from a fuel cell or charging is completed, the power supply to a circuit, which controls the operation of a circuit for supplying a charging current to a secondary battery, is interrupted to stop supplying the charging current to the secondary battery, thereby proceeding to a low consumption current mode in which consumption of scarce current can be reduced. Therefore, it is possible to greatly improve power efficiency of mobile devices charging a secondary battery using an energy-limited fuel cell.

BRIEF DESCRIPTION OF THE DRAWINGS

FIG. 10 is a flowchart showing an example of a charging control method of typical charging circuits.

DETAILED DESCRIPTION OF THE PREFERRED EMBODIMENTS

Next, a description will specifically be made about the present invention based on the embodiments as shown in the accompanying drawings.

First Embodiment

Figure 1:
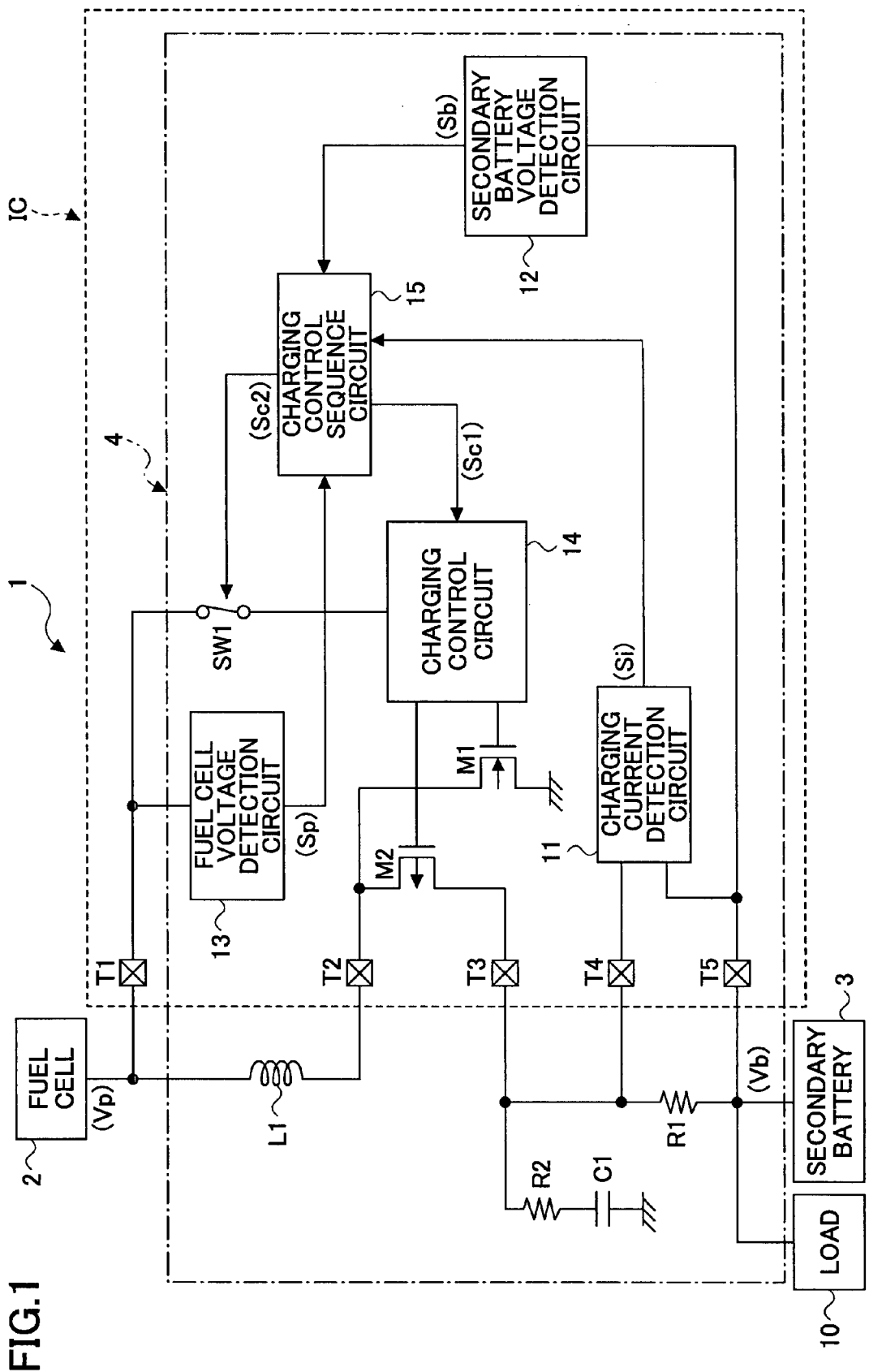
FIG. 1 is a block diagram showing a configuration example of a power supply unit having a charging circuit according to a first embodiment of the present invention.

FIG. 1 is a block diagram showing a configuration example of a power supply unit having a charging circuit according to a first embodiment of the present invention.

In FIG. 1, a power supply unit 1 includes a fuel cell 2 which outputs a generated voltage Vp, a secondary battery 3 composed of a lithium-ion battery, a charging circuit 4 which charges the secondary battery 3 with the voltage obtained by boosting the fuel cell voltage Vp as a battery voltage of the fuel cell 2.

The charging circuit 4 includes a switching element M1 composed of an NMOS transistor which performs a switching operation for controlling the output of the fuel cell voltage Vp, a switching element M2 for synchronous rectification composed of a PMOS transistor, an inductor L1, a capacitor C1, resistances R1 and R2, and a first switch SW1. Further, the charging circuit 4 includes: a charging current detection circuit 11 which detects the charging current to the secondary battery 3 from the both-end voltage of the resistance R1 for detecting a charging current, and generates and outputs a signal Si indicative of the detected current value; a secondary battery voltage detection circuit 12 which detects a secondary battery voltage Vb as a voltage of the secondary battery 3, and generates and outputs a signal Sb indicative of the detection result; and a fuel cell voltage detection circuit 13 which detects the fuel cell voltage Vp, and generates and outputs a signal Sp indicative of the detection result.

Moreover, the charging circuit 4 includes: a charging control circuit 14 which performs the switching control of the switching element M1 and that of the switching element M2 for synchronous rectification; and a charging control sequence circuit 15 which performs the operations control of the charging control circuit 14 using a control signal Sc1 generated depending on the output signal Si output from the charging current detection circuit 11, the output signal Sb output from the secondary battery voltage detection circuit 12, and the output signal Sp output from the fuel cell voltage detection circuit 13. The switching element M1, the switching element M2 for synchronous rectification, the first switch SW1, the charging current detection circuit 11, the secondary battery voltage detection circuit 12, the fuel cell voltage detection circuit 13, the charging control circuit 14, and the charging control sequence circuit 15 are integrated into one IC (integrated circuit), and the IC includes terminals T1 through T5.

Note that the switching element M1, the switching element M2 for synchronous rectification, the inductor L1, the capacitor C1, and the resistance R2 together serve as a charging current supply circuit unit. The charging current detection circuit 11 and the secondary battery voltage detection circuit 12 serve as a charging current detection circuit unit and a secondary battery voltage detection unit, respectively. Further, the charging control circuit 14 and the charging control sequence circuit 15 together serve as a charging control circuit unit. The charging control sequence circuit 15 serves as a control circuit. The first switch SW1 and the second switch SW2 serve as a first switch circuit and a second switch circuit, respectively. Furthermore, the switching element M1 and the switching element M2 for synchronous rectification together serve as a transistor circuit.

The fuel cell voltage Vp is input to the IC through the terminal T1, and the fuel cell voltage Vp input to the terminal T1 is input to the charging control circuit 4 as a power supply through the first switch SW1 and simultaneously input to the fuel cell voltage detection circuit 13. The inductor L1 is externally attached between the terminals T1 and T2, and a series circuit of the resistance R2 and the capacitor C1 is externally attached between the terminal T3 and ground potential. The switching element M1 is connected between the terminal T2 and ground potential, and the switching element M2 for synchronous rectification is connected between the terminals T2 and T3. The gates of the switching element M1 and the switching element M2 for synchronous rectification are each connected to the charging control circuit 14. The charging control circuit 14 controls the switching of the switching element M1 and the switching element M2 for synchronous rectification depending on the control signal Sc1 from the charging control sequence circuit 15.

The terminals T3 and T4 are connected to each other on the outside, and the resistance R1 is connected between the terminals T4 and T5. The terminals T4 and T5 are each connected to the charging current detection circuit 11. Further, the secondary battery 3 is connected to the connecting portions of the resistance R1 and the terminal T5, and the secondary battery voltage Vb as a voltage of the secondary battery 3 is input to the secondary battery voltage detection circuit 12 through the terminal T5. The output signal Si output from the charging current detection circuit 11, the output signal Sb output from the secondary battery voltage detection circuit 12, and the output signal Sp output from the fuel cell voltage detection circuit 13 are each input to the charging control sequence circuit 15. The charging control circuit 14 is supplied with power from the fuel cell 2 through the first switch SW1, and the first switch SW1 performs switching control in response to a control signal Sc2 from the charging control sequence circuit 15. A load 10 is connected to the terminal T5 for power supply. Note that although the power supply line is omitted in FIG. 1, the charging current detection circuit 11, the secondary battery voltage detection circuit 12, and the charging control sequence circuit 15 are supplied with power at all times to operate.

With such a configuration, the charging control sequence circuit 15 causes the charging control circuit 14 to perform either constant-current charging or constant-voltage charging for the secondary battery 3. In the case of constant-current charging, the charging control sequence circuit 15 detects the charging current passing through the secondary battery 3 from the signal Si input from the charging current detection circuit 11, and causes the switching element M1 to generate PWM (pulse width modulation) control or PFM (pulse frequency modulation) control through the charging control circuit 14 to perform a switching operation such that the detected charging current becomes constant at a predetermined value. Simultaneously, the charging control sequence circuit 15 causes the switching element M2 for synchronous rectification to perform a switching operation contrary to the switching element M1 through the charging control circuit 14.

In the case of constant-voltage charging, the charging control sequence circuit 15 detects the secondary battery voltage Vb from the signal Sb input from the secondary battery voltage detection circuit 12, and causes the switching element M1 to generate PWM control or PFM control through the charging control circuit 14 to perform a switching operation such that the secondary battery voltage Vb becomes constant at a predetermined value so as not to exceed the rated voltage. Simultaneously, the charging control sequence circuit 15 causes the switching element M2 for synchronous rectification to perform a switching operation contrary to the switching element M1 through the charging control circuit 14.

When the switching element M1 is turned on to create an electrical connection and simultaneously the switching element M2 for synchronous rectification is turned off to cut off an electrical connection, energy is accumulated in the inductor L1. Thereafter, when the switching element M1 is turned off to cut off an electrical connection and the switching element M2 for synchronous rectification is turned on to create an electrical connection, the energy accumulated in the inductor L1 is released to augment the fuel cell voltage Vp and is output to the terminal T3. Moreover, the released energy is smoothed by the resistance R2 and the capacitor C1, and the fuel cell voltage Vp is boosted. The boosted voltage is applied to the secondary battery 3.

On the other hand, the charging current to the secondary battery 3 is reduced when the secondary battery voltage Vb gets close to a prescribed constant voltage. When the charging current has become less than the charging completion current value as a reference for determining whether the charging has been completed, the charging control sequence circuit 15 determines that charging the secondary battery 3 has been completed, and proceeds to a first low consumption current mode. The charging control sequence circuit 15 turns off the first switch SW1 to cut off an electrical connection and stop the operation of the charging control circuit 14, and turns off both of the switching element M1 and the switching element M2 for synchronous rectification to cut off electrical connections, such that the charging current becomes 0 mA. Note that the charging control sequence circuit 15 turns on the first switch SW1 to create an electrical connection when the operation of the first low consumption current mode is not performed.

In the first low consumption current mode, for example, when the charging control circuit 14 is configured to control a charging current with a switching converter, an error amplification circuit, an oscillation circuit, a reference voltage source circuit, or the like constituting the charging control circuit 14, each stops the operation. Further, the secondary battery voltage detection circuit 12 is caused to operate at all times so that the charging control sequence circuit 15 can determine whether to start recharging. Therefore, when the secondary battery 3 is discharged so as to reduce the secondary voltage Vb, the charging control sequence circuit 15 turns on the first switch SW1 to create an electrical connection and is capable of charging the secondary battery 3 by starting the charging control circuit 14 whose operation has been suspended.

Figure 2:
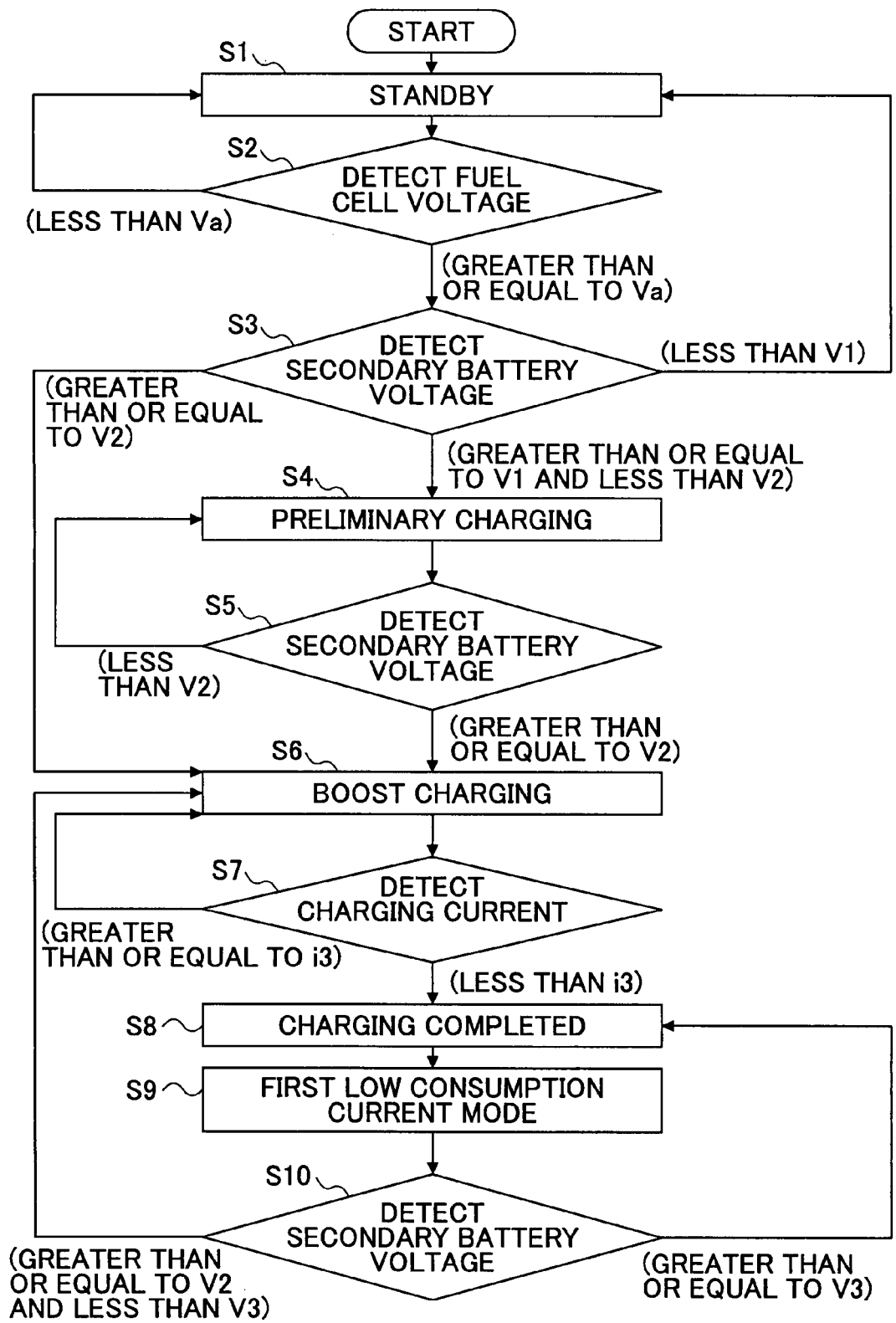
FIG. 2 is a flowchart showing an operations example of the charging circuit 4 of FIG. 1.

FIG. 2 is a flowchart showing an operations example of the charging circuit 4 of FIG. 1. Referring now to FIG. 2, a description will be made about an operations flow of the charging circuit 4.

In FIG. 2, the charging control sequence circuit 15 first turns on the first switch SW1 to create an electrical connection and simultaneously causes the charging control circuit 14 to turn off the switching element M1 and the switching element M2 for synchronous rectification to cut off an electrical connection, thereby creating a standby state (step S1). Next, the charging control sequence circuit 15 detects the fuel cell voltage Vp using the signal Sp from the fuel cell voltage detection circuit 13 (step S2). When the fuel cell voltage Vp has become less than a specified voltage Va, the charging control sequence circuit 15 returns to step S1 and maintains the standby state.

Further, in step S2, when the fuel cell voltage Vp has become greater than or equal to the specified voltage value Va, the charging control sequence circuit 15 detects the secondary battery voltage Vb using the signal Sb from the secondary battery voltage detection circuit 12 (step S3). In step S3, when the secondary battery voltage Vb has become less than a predetermined first voltage value V1, the charging control sequence circuit 15 returns to step S1. When the secondary battery voltage Vb has become greater than or equal to the first voltage value V1 and less than a predetermined second voltage value V2 greater than the first voltage value V1, the charging control sequence circuit 15 causes the charging control circuit 14 to perform the operation of preliminary charging (step S4). The preliminary charging refers to a charging mode in which the charging control sequence circuit 15 causes the charging control circuit 14 to perform charging with a small first current value i1 such as several tens of mA until the secondary battery voltage Vb has become greater than or equal to the second voltage value V2 since sudden charging of the over discharged secondary battery 3 with high current may bring about overheating and a fire. Further, in step S3, when the secondary battery voltage Vb has become greater than or equal to the second voltage value V2, the charging control sequence circuit 15 proceeds to the boost charging mode of step S6 as will be described below.

The charging control sequence circuit 15 checks the secondary battery voltage Vb all the time during the preliminary charging of step S4 (step S5). When the secondary battery voltage Vb has become less than the secondary voltage value V2, the charging control sequence circuit 15 returns to step S4 and causes the charging control circuit 14 to continuously perform the preliminary charging. Further, in step S5, when the secondary battery voltage Vb has become greater than or equal to the secondary voltage value V2, the charging control sequence circuit 15 proceeds from the preliminary charging to the boost charging (step S6). The boost charging refers to a charging mode in which the charging control sequence circuit 15 first, for example, causes the charging control circuit 14 to perform constant-current charging with high current for quickly charging the secondary battery 3 and then performs constant-voltage charging for the secondary battery 3 when the secondary battery voltage Vb has becomes a predetermined third voltage value V3 greater than the second voltage value V2. Hereinafter, the charging current value at the time of the boost charging is referred to as a second current value i2.

Next, the charging control sequence circuit 15 checks the charging current all the time during the boost charging of step S6 (step S7). When the current value of the charging current has become greater than or equal to a predetermined charging completion current value i3 which is less than the second current value i2 and greater than or equal to the first current value i1 of the preliminary charging, the charging control sequence circuit 15 causes the charging control circuit 14 to continuously perform the preliminary charging of step S6. Further, in step S7, when the charging current has become less than the charging completion current value i3, the charging control sequence circuit 15 determines that the charging has been completed, and causes the charging control circuit 14 to perform a charging complete operation in which the switching element M1 and the switching element M2 for synchronous rectification are each turned off to cut off electrical connections (step S8).

Subsequently, the charging control sequence circuit 15 proceeds to the first low consumption current mode, and turns off the first switch SW1 to cut off an electrical connection, whereby the power supply to the charging control circuit 14 is interrupted (step S9). Even in the first low consumption current mode of step S9, the charging control sequence circuit 15 checks the secondary battery voltage Vb all the time from the signal Sb input from the secondary battery voltage detection circuit 12 (step S10). The charging control sequence circuit 15 returns to step S8 when the secondary battery voltage Vb has become greater than or equal to the third voltage value V3, and returns to step S6 when the secondary battery voltage Vb has become less than the third voltage value V3.

As described above, when the charging is completed and no charging current passes through the secondary battery 3, the first switch SW1 is turned off to interrupt the power supply to the charging control circuit 14.

Figure 3:
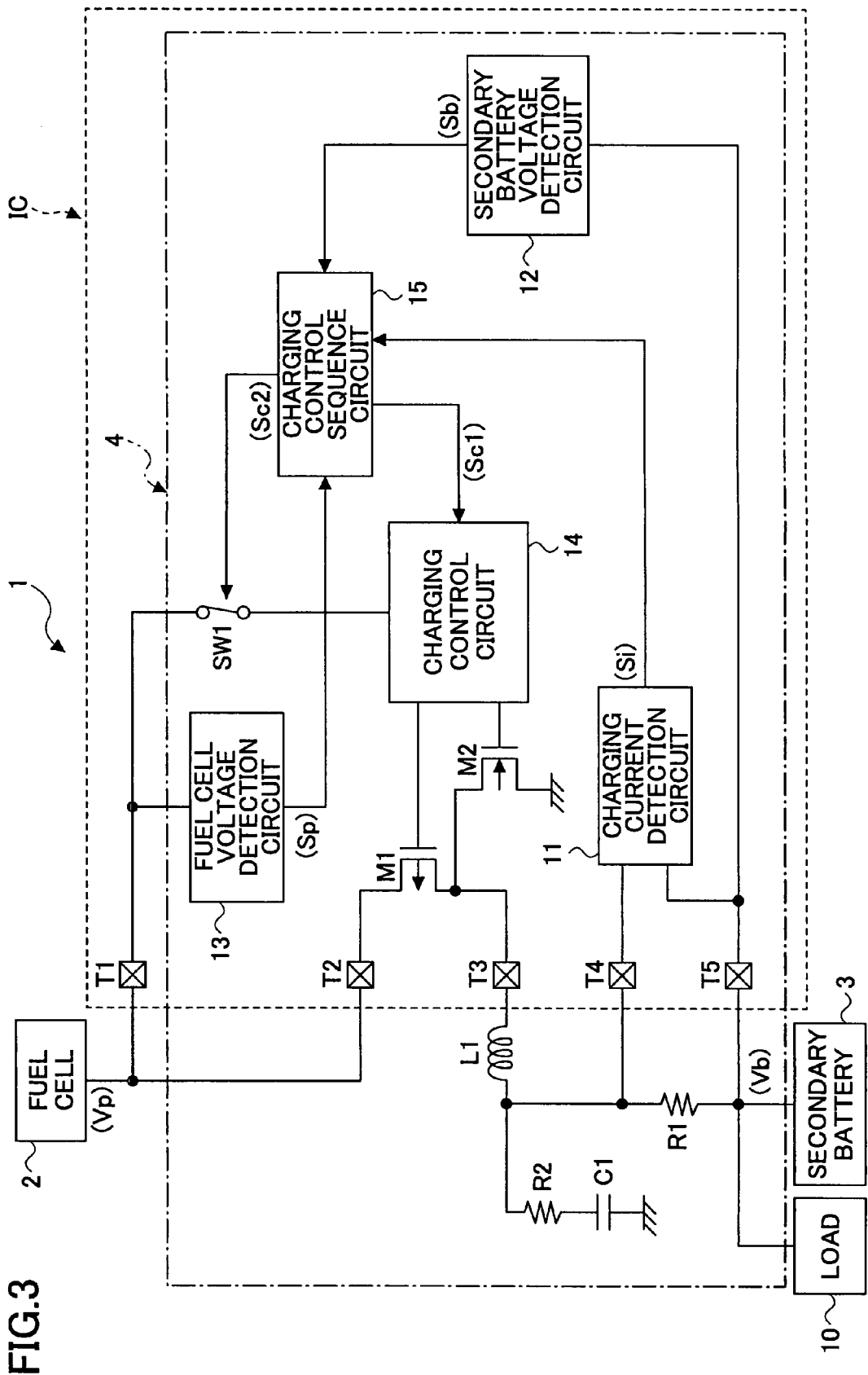
FIG. 3 is a block diagram showing another configuration example of the power supply unit having the charging circuit according to the first embodiment of the present invention.

Although FIG. 1 shows a case in which the secondary battery 3 is charged with the voltage obtained by boosting the fuel cell voltage Vp, it may be charged with the voltage obtained by reducing the fuel cell voltage Vp. Such an arrangement modified from FIG. 1 is shown in FIG. 3. In FIG. 3, components the same as or similar to those of FIG. 1 are indicated by the same numerals and will not be described below. Here, only parts different from FIG. 1 will be described.

FIG. 3 is different from FIG. 1 in that the switching element M1 is composed of a PMOS transistor and the switching element M2 for synchronous rectification is composed of an NMOS transistor. Also, the charging circuit 4 of FIG. 1 charges the secondary battery 3 with the voltage obtained by reducing the fuel cell voltage Vp.

In FIG. 3, the terminals T1 and T2 are connected to each other on the outside, and the inductor L1 is externally attached between the terminals T3 and T4. A series circuit of the resistance R2 and the capacitor C1 is externally attached between the terminal T4 and ground potential. The switching element M1 is connected between the terminals T2 and T3, and the switching element M2 for synchronous rectification is connected between the terminal T3 and ground potential. The gates of the switching element M1 and the switching element M2 for synchronous rectification are each connected to the charging control circuit 14. The charging control circuit 14 causes the switching element M1 and the switching element M2 for synchronous rectification to generate PWM control or PFM control to perform a switching operation. In this case, the charging control circuit 14 causes the switching element M1 and the switching element Ms for synchronous rectification to perform a contrary switching operation so that they are not simultaneously turned on. The operations of other parts will not be described since they are performed in a manner same as the case of FIG. 1.

As described above, when the charging of the secondary battery 3 is completed, the charging circuit of the secondary battery according to the first embodiment turns off the first switch SW1 to interrupt the power supply to the charging control circuit 14. Therefore, when the charging is completed and no charging current passes through the secondary battery, it is possible to reduce scarce current passing through the charging control circuit 14 to a minimum. As a result, power efficiency can be greatly improved.

Second Embodiment

The above-described first embodiment may be arranged so that power is supplied to the charging current detection circuit 11 through the second switch SW2, and when the fuel cell voltage Vp has dropped to less than the specified voltage value Va, the first switch SW1 and the second switch SW2 are each turned off to cut off electrical connections and the power supply to the charging current detection circuit 11 and the charging control circuit 14 is interrupted. Here, those arranged in the above manner will be described as a second embodiment according to the present invention.

Figure 4:
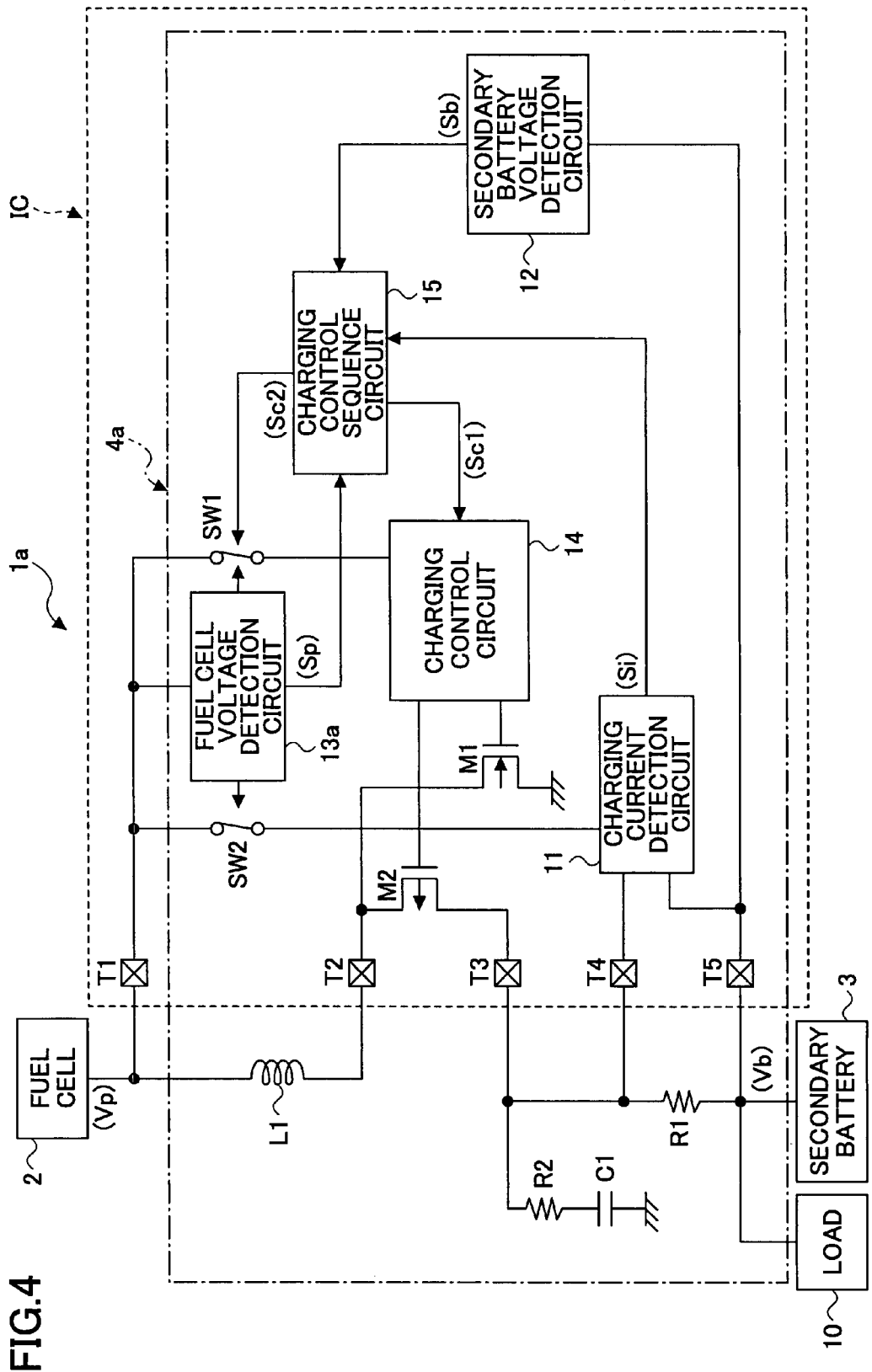
FIG. 4 is a block diagram showing a configuration example of a power supply unit having a charging circuit according to a second embodiment of the present invention.

FIG. 4 is a block diagram showing a configuration example of a power supply unit having a charging circuit according to the second embodiment of the present invention. In FIG. 4, components the same as or similar to those of FIG. 1 will be indicated by the same numerals and will not be described below. Here, only parts different from FIG. 1 will be described.

FIG. 4 is different from FIG. 1 in that the charging circuit 4 of FIG. 1 includes the second switch SW2 for supplying power to the charging current detection circuit 11 and that the fuel cell voltage detection circuit 13 performs the switching control of the first switch SW1 and the second switch SW2. Accordingly, the fuel cell voltage detection circuit 13, the charging circuit 4, and the power supply unit 1 of FIG. 1 are denoted as a fuel cell voltage detection circuit 13a, a charging circuit 4a, and a power supply unit 1a, respectively. In FIG. 4, the power supply unit 1a includes the fuel cell 2, the secondary battery 3, and the charging circuit 4a which charges the secondary battery 3 with the voltage obtained by boosting the fuel cell voltage Vp.

The charging circuit 4a includes the switching element M1, the switching element M2 for synchronous rectification, the inductor L1, the capacitor C1, the resistances R1 and R2, the first switch SW1, the second switch SW2, the charging current detection circuit 11, the secondary battery voltage detection circuit 12, the fuel cell voltage detection circuit 13a, the charging control circuit 14, and the charging control sequence circuit 15. The switching element M1, the switching element M2 for synchronous rectification, the first switch SW1, the second switch SW2, the charging current detection circuit 11, the secondary battery voltage detection circuit 12, the fuel cell voltage detection circuit 13a, the charging control circuit 14, and the charging control sequence circuit 15 are integrated into one IC, and the IC includes the terminals T1 through T5. Note that the fuel cell voltage detection circuit 13a serves as a fuel cell voltage detection unit.

The fuel cell voltage Vp input to the terminal T1 is inputted as a power supply into the charging current detection circuit 11 through the second switch SW2 and simultaneously input to the fuel cell voltage detection circuit 13a. The charging current detection circuit 11 is supplied with power from the fuel cell 2 through the second switch SW2, and the switching control of the second switch SW2 is performed by the fuel cell voltage detection circuit 13a. Further, the fuel cell voltage detection circuit 13a also performs the switching control of the first switch SW1. Therefore, the switching control of the first switch SW1 is performed by the fuel cell voltage detection circuit 13a and the charging control sequence circuit 15.

With such a configuration, the fuel cell voltage detection circuit 13a detects the fuel cell voltage Vp. When the fuel cell voltage Vp has dropped to less than the specified voltage value Va to be unable to obtain the current necessary for charging the secondary battery 3, the fuel cell voltage detection circuit 13a performs the operation of a second low consumption current mode in which the first switch SW1 and the second switch SW2 are each turned off to cut off electrical connections, whereby the power supply to the charging current detection circuit 11 and the charging control circuit 14 is stopped. Further, when the fuel cell voltage Vp has become greater than or equal to the specified voltage value Va, the fuel cell voltage detection circuit 13a turns on each of the first switch SW1 and the second switch SW2 to create an electrical connections, whereby power is supplied to the charging current detection circuit 11 and the charging control circuit 14 to cancel the operation of the second low consumption current mode.

In the first low consumption current mode and the second low consumption current mode, for example, when the charging control circuit 14 is configured to control a charging current with a switching converter, an error amplification circuit, an oscillation circuit, a reference voltage source circuit, or the like constituting the charging control circuit 14, each stops the operation. Further, although the power supply line is omitted in FIG. 4, the secondary battery voltage detection circuit 12 and the charging control sequence circuit 15 are supplied with power at all times to operate. The secondary battery voltage 12 and the fuel cell voltage detection circuit 13a are caused to operate at all times. Therefore, when the secondary battery 3 is discharged to reduce the secondary voltage Vb, the charging control sequence circuit 15 turns on the first switch SW1 to create an electrical connection and is capable of charging the secondary battery 3 by starting the charging control circuit 14 which has been suspended. When the fuel cell voltage Vp has become greater than or equal to the specified voltage value Va, the fuel cell voltage detection circuit 13a turns on each of the first switch SW1 and the second switch SW2 to create electrical connections and is capable of charging the secondary battery 3 by starting charging current detection circuit 11 and the charging control circuit 14 which have been suspended.

Figure 5:
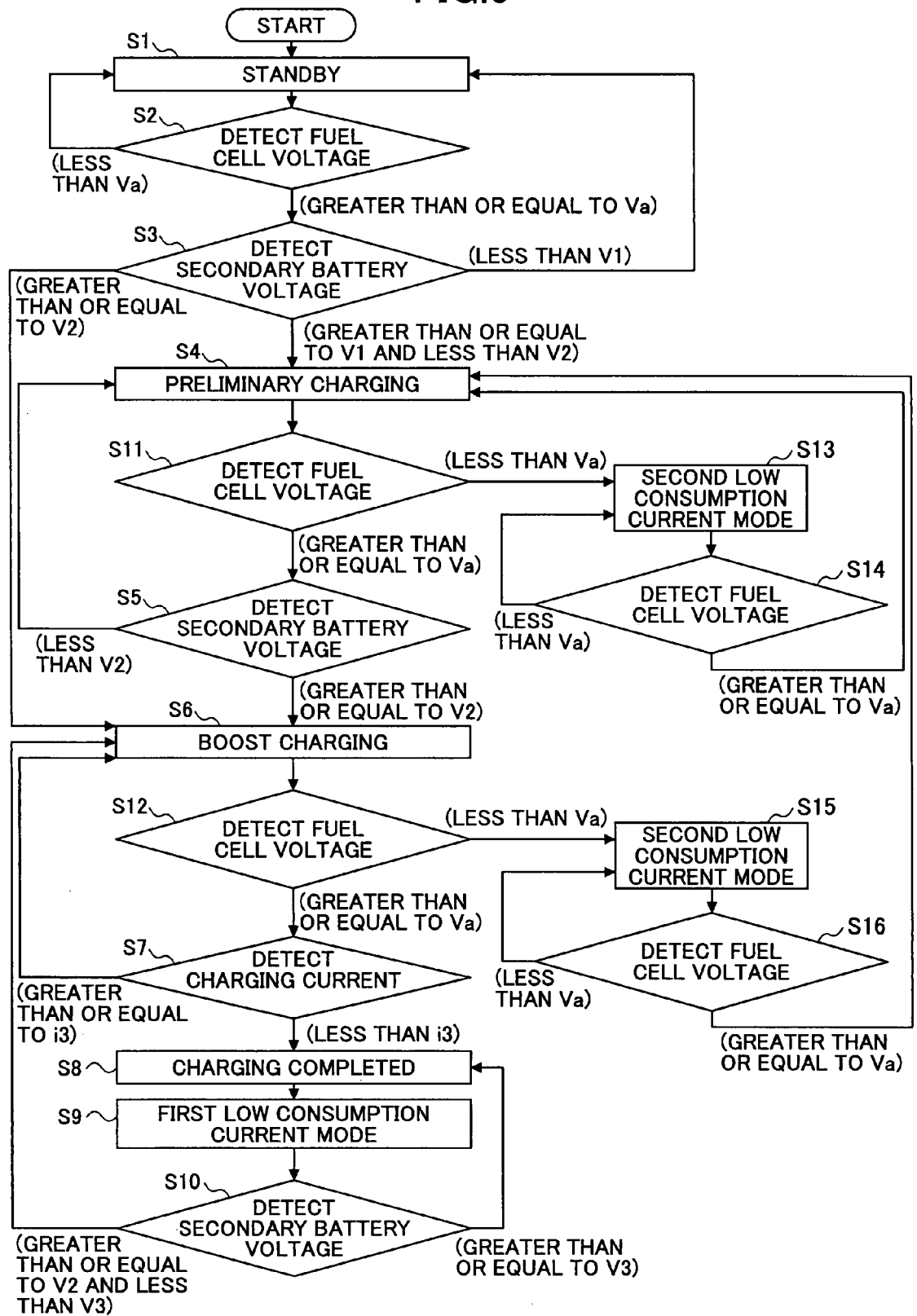
FIG. 5 is a flowchart showing an operations example of the charging circuit 4a of FIG. 4.

FIG. 5 is a flowchart showing an operations example of the charging circuit 4a of FIG. 4. Referring now to FIG. 5, a description will be made an operations flow of the charging circuit 4a. In FIG. 5, flows the same as or similar to those of FIG. 2 are indicated by the same numerals and will not be described below. Here, only parts different from FIG. 2 will be described.

FIG. 5 is different from FIG. 2 in that the process of step S11 between step S4 and step S5 of FIG. 2, the process of step S12 between step S6 and step S7 of FIG. 2, and the processes of steps S13 through S16 are added.

In FIG. 5, the fuel cell voltage detection circuit 13a detects fuel cell voltage Vp all the time during the preliminary charging of step S4 (step S11). When the fuel cell voltage Vp has become greater than or equal to the specified voltage value Va, the fuel cell voltage detection circuit 13a proceeds to step S5. Further, in step S11, when the fuel cell voltage Vp has become less than the specified voltage value Va, the fuel cell voltage detection circuit 13a proceeds to the second low consumption current mode (step S13), and turns off each of the first switch SW1 and the second switch SW2 to cut off electrical connections, whereby the power supply to the charging current detection circuit 11 and the charging control circuit 14 is interrupted. Even in the second low consumption current mode of step S13, the fuel cell voltage detection circuit 13a detects the fuel cell voltage Vp all the time (step S14). The fuel cell voltage detection circuit 13a returns to step S13 when the fuel cell voltage Vp has become less than the specified voltage value Va, and returns to step S4 when the fuel cell voltage Vp has become greater than or equal to the specified voltage value Va.

The fuel cell voltage detection circuit 13a detects the fuel cell voltage Vp all the time during the boost charging of step S6 (step S12). When the fuel cell voltage Vp has become greater than or equal to the specified voltage value Va, the fuel cell voltage detection circuit 13a proceeds to step S7. Further, in step S12, when the fuel cell voltage Vp has become less than the specified voltage value Va, the fuel cell voltage detection circuit 13a proceeds to the second low consumption current mode (step S15), and turns off each of the first switch SW1 and the second switch SW2 to cut off electrical connections, whereby the power supply to the charging current detection circuit 11 and the charging control circuit 14 is interrupted.

Even in the second low consumption current mode of step S15, the fuel cell voltage detection circuit 13a detects the fuel cell voltage Vp all the time (step S16). The fuel cell voltage detection circuit 13a returns to step S15 when the fuel cell voltage Vp has become less than the specified voltage value Va, and returns to step S4 when the fuel cell voltage Vp has become greater than or equal to the specified voltage value Va.

As described above, when the fuel cell voltage Vp has become less than the specified voltage value Va to be unable to charge the secondary battery 3, the first switch SW1 and the second switch SW2 are each turned off to interrupt the power supply to the charging current detection circuit 11 and the charging control circuit 14.

Although FIG. 4 shows a case in which the secondary battery 3 is charged with the voltage obtained by boosting the fuel cell voltage Vp, it may be charged with the voltage obtained by reducing the fuel cell voltage Vp. In this case, since the switching element M1, the switching element M2 for synchronous rectification, and the inductor L1 of FIG. 4 are similar to those of FIG. 3, the description thereof is omitted.

As described above, when the fuel cell voltage Vp has become less than the specified voltage value Va to be unable to charge the secondary battery 3, the charging circuit of the secondary battery according to the second embodiment turns off each of the first switch SW1 and the second switch SW2 to interrupt the power supply to the charging current detection circuit 11 and the charging control circuit 14. When the charging of the secondary battery 3 is completed, the first switch SW1 is turned off to interrupt the power supply to the charging control circuit 14. Therefore, it is possible to obtain the same effect as that of the first embodiment and reduce scarce current passing through the charging current detection circuit 11 and the charging control circuit 14 to a minimum when power cannot be supplied from the fuel cell. As a result, power efficiency can further be improved.

Third Embodiment

In the above-described second embodiment, when the fuel cell voltage Vp has become less than the specified voltage value Va, the power supply to the charging current detection circuit 11 and the charging control circuit 14 is interrupted. Alternatively, as a third embodiment of the present invention, there may be provided a temperature sensing circuit which senses the temperature of the fuel cell 2 to interrupt the power supply to each of the charging current detection circuit 11 and the charging control circuit 14 when the temperature of the fuel cell 2 has become greater than or equal to a predetermined value.

Figure 6:
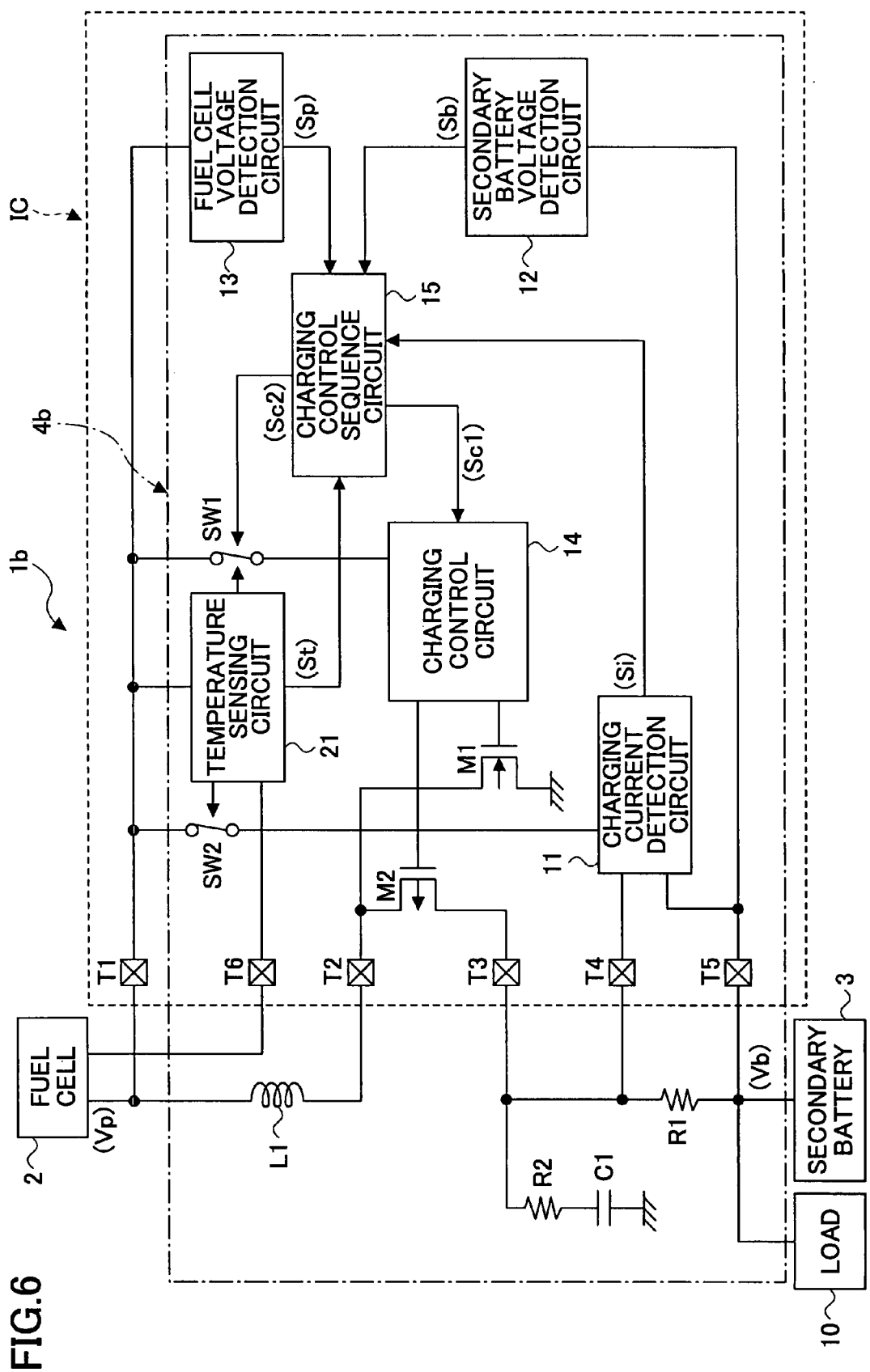
FIG. 6 is a block diagram showing a configuration example of a power supply unit having a charging circuit according a third embodiment of the present invention.

FIG. 6 is a block diagram showing a configuration example of a power supply unit having a charging circuit according to the third embodiment of the present invention. In FIG. 6, components the same as or similar to those of FIG. 1 are indicated by the same numerals and will not be described below. Here, only parts different from FIG. 1 will be described.

FIG. 6 is different from FIG. 1 in that the charging circuit 4 of FIG. 1 includes a temperature sensing circuit 21 which senses the temperature of the fuel cell 2 and that the temperature sensing circuit 21 performs the switching control of the first switch SW1 and the second switch SW2. Accordingly, the charging circuit 4 and the power supply unit 1 of FIG. 1 are denoted as a charging circuit 4b and a power supply unit 1b, respectively.

In FIG. 6, the power supply unit 1b includes the fuel cell 2, the secondary battery 3, and the charging circuit 4b which charges the secondary battery 3 with the voltage obtained by boosting the fuel cell voltage Vp.

The charging circuit 4b includes the switching element M1, the switching element M2 for synchronous rectification, the inductor L1, the capacitor C1, the resistances R1 and R2, the first switch SW1, the second switch SW2, the charging current detection circuit 11, the secondary battery voltage detection circuit 12, the fuel cell voltage detection circuit 13, the charging control circuit 14, the charging control sequence circuit 15, and the temperature sensing circuit 21. The switching element M1, the switching element M2 for synchronous rectification, the first switch SW1, the second switch SW2, the charging current detection circuit 11, the secondary battery voltage detection circuit 12, the fuel cell voltage detection circuit 13, the charging control circuit 14, the charging control sequence circuit 15, and the temperature sensing circuit 21 are integrated into one IC, and the IC includes the terminals T1 through T5 and a terminal T6. Note that the temperature sensing circuit 21 serves as a temperature sensing circuit unit.

A temperature sensor (not shown) is provided, for example, in or near the fuel cell 2, and a signal indicative of the temperature of the fuel cell 2 sensed by the temperature sensor is input to the temperature sensing circuit 21 through the terminal T6. The temperature sensing circuit 21 performs the switching control of the second switch SW2. Since the temperature sensing circuit 21 also performs the switching control of the first switch SW1, the switching operation of the first switch SW1 is performed by the charging control sequence circuit 15 and the temperature sensing circuit 21.

With such a configuration, the temperature sensing circuit 21 senses the temperature of the fuel cell 2. When the temperature of the fuel cell 2 has risen above a predetermined value Ta, the temperature sensing circuit 21 performs the operation of the second low consumption current mode in which the first switch SW1 and the second switch SW2 are each turned off to cut off electrical connections, whereby the power supply to the charging current detection circuit 11 and the charging control circuit 14 is stopped. Further, when the temperature of the fuel cell 2 has become less than the predetermined value Ta, the temperature sensing circuit 21 turns on each of the first switch SW1 and the second switch SW2 to create electrical connections, whereby power is supplied to the charging current detection circuit 11 and the charging control circuit 14 to cancel the operation of the second low consumption current mode.

In the first low consumption current mode and the second low consumption current mode, for example, when the charging control circuit 14 is configured to control a charging current with a switching converter, an error amplification circuit, an oscillation circuit, a reference voltage source circuit, or the like constituting the charging control circuit 14, each stops the operation. Further, although the power supply line is omitted in FIG. 6, the secondary battery voltage detection circuit 12 and the charging control sequence circuit 15 are supplied with power at all times to operate. The secondary battery voltage detection circuit 12 and the temperature sensing circuit 21 are caused to operate at all times. Therefore, when the secondary battery 3 is discharged to reduce the secondary voltage Vb, the charging control sequence circuit 15 turns on the first switch SW1 to create an electrical connection and is capable of charging the secondary battery 3 by starting the charging control circuit 14 which has been suspended. When the temperature of the fuel cell 2 has become less than the predetermined value Ta, the temperature sensing circuit 21 turns on each of the first switch SW1 and the second switch SW2 to create electrical connections and is capable of charging the secondary battery 3 by starting charging current detection circuit 11 and the charging control circuit 14 which have been suspended.

Figure 7:
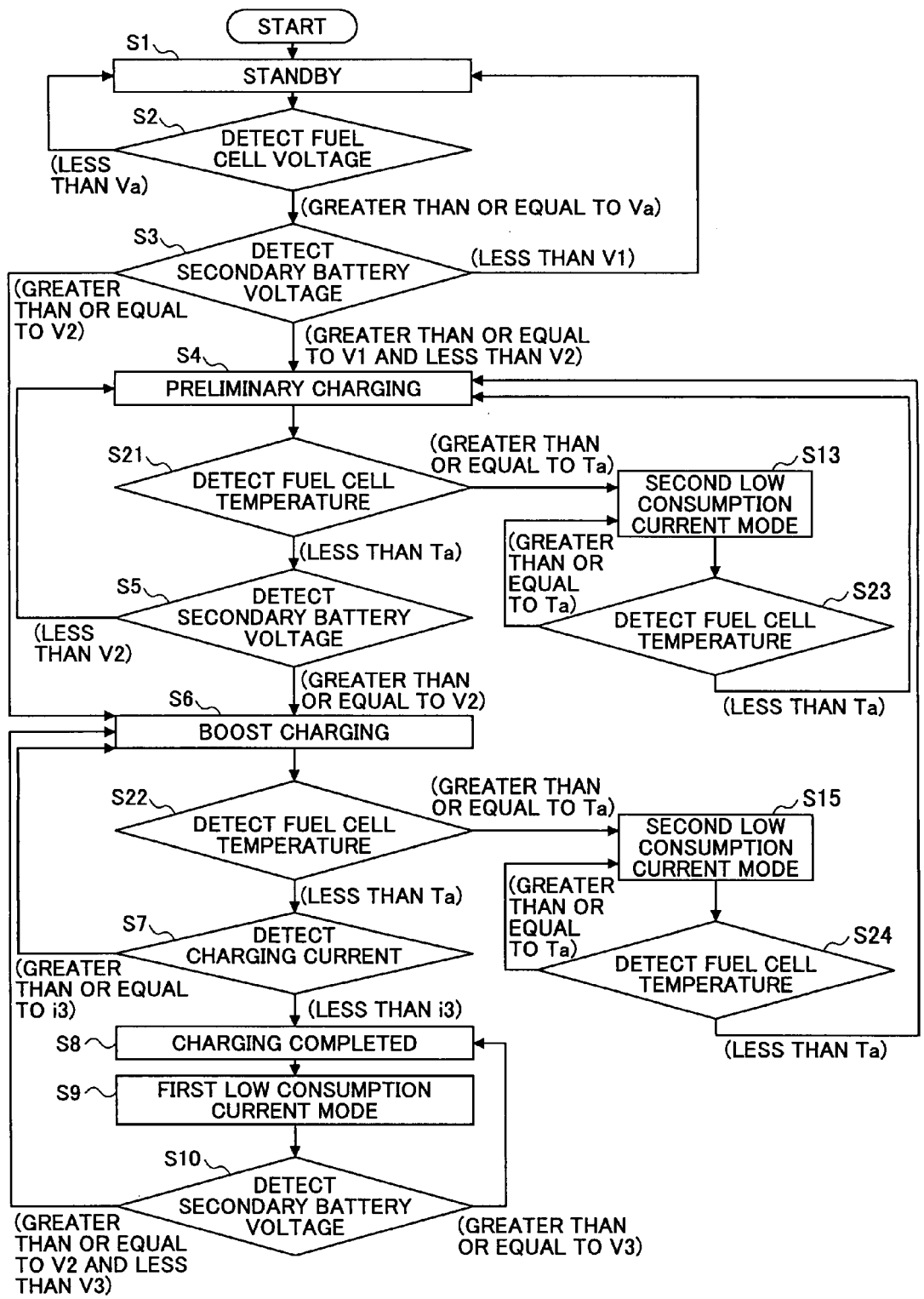
FIG. 7 is a flowchart showing an operations example of the charging circuit 4b of FIG. 6.

FIG. 7 is a flowchart showing an operations example of the charging circuit 4b of FIG. 6. Referring now to FIG. 7, a description will be made an operations flow of the charging circuit 4b. In FIG. 7, flows the same as or similar to those of FIG. 5 are indicated by the same numerals and will not be described below. Here, only parts different from FIG. 5 will be described.

FIG. 7 is different from FIG. 5 in that the processes of steps S11, S12, S14, and S16 of FIG. 5 are replaced by the processes of steps 21 through S24.

In FIG. 7, the temperature sensing circuit 21 senses the temperature of the fuel cell 2 all the time during the preliminary charging of step S4 (step S21). When the temperature of the fuel cell 2 has become less than the predetermined value Ta, the temperature sensing circuit 21 proceeds to step S5. Further, in step S21, when the temperature of the fuel cell 2 has become greater than or equal to the predetermined value Ta, the temperature sensing circuit 21 proceeds to the second low consumption current mode (step S13), and turns off each of the first switch SW1 and the second switch SW2 to cut off electrical connections, whereby the power supply to the charging current detection circuit 11 and the charging control circuit 14 is interrupted. Even in the second low consumption current mode of step S13, the temperature sensing circuit 21 senses the temperature of the fuel cell 2 all the time (step S23). The temperature sensing circuit 21 returns to step S13 when the temperature of the fuel cell 2 has become greater than or equal to the predetermined value Ta, and returns to step S4 when the temperature of the fuel cell 2 has become less than the predetermined value Ta.

The temperature sensing circuit 21 senses the temperature of the fuel cell 2 all the time during the boost charging of step S6 (step S22). When the temperature of the fuel cell 2 has become less than the predetermined value Ta, the temperature sensing circuit 21 proceeds to step S7. Further, in step S22, when the temperature of the fuel cell 2 has become greater than or equal to the predetermined value Ta, the temperature sensing circuit 21 proceeds to the second low consumption current mode (step S15), and turns off each of the first switch SW1 and the second switch SW2 to cut off electrical connections, whereby the power supply to the charging current detection circuit 11 and the charging control circuit 14 is interrupted.

Even in the second low consumption current mode of step S15, the temperature sensing circuit 21 senses the temperature of the fuel cell 2 all the time (step S24). The temperature sensing circuit 21 returns to step S15 when the temperature of the fuel cell 2 has become greater than or equal to the predetermined value Ta, and returns to step S4 when the temperature of the fuel cell 2 has become less than the predetermined value Ta.

As described above, when the temperature of the fuel cell 2 has become greater than or equal to the predetermined value Ta, the first switch SW1 and the second switch SW2 are each turned off to interrupt the power supply to the charging current detection circuit 11 and the charging control circuit 14.

Although FIG. 6 shows a case in which the secondary battery 3 is charged with the voltage obtained by boosting the fuel cell voltage Vp, it may be charged with the voltage obtained by reducing the fuel cell voltage Vp. In this case, since the switching element M1, the switching element M2 for synchronous rectification, and the inductor L1 of FIG. 6 are similar to those of FIG. 3, the description thereof is omitted.

As described above, when the temperature of the fuel cell 2 has become greater than or equal to the predetermined value Ta, the charging circuit of the secondary battery according to the third embodiment turns off each of the first switch SW1 and the second switch SW2 to interrupt the power supply to the charging current detection circuit 11 and the charging control circuit 14. When the charging of the secondary battery 3 is completed, the first switch SW1 is turned off to interrupt the power supply to the charging control circuit 14. Therefore, it is possible to obtain the same effect as that of the first embodiment and reduce scarce current passing through the charging current detection circuit 11 and the charging control circuit 14 to a minimum when the temperature of the secondary battery 2 abnormally increases to be unable to charge the secondary battery 3. As a result, power efficiency can further be improved.

Fourth Embodiment

In the above-described third embodiment, when the temperature of the fuel cell 2 has become greater than or equal to the predetermined value Ta, the power supply to the charging current detection circuit 11 and the charging control circuit 14 is interrupted. Alternatively, as a fourth embodiment of the present invention, when the fuel cell voltage Vp has dropped to less than the specified voltage value Va and/or when the temperature of the fuel cell 2 has become greater than or equal to the predetermined value, the power supply to the charging current detection circuit 11 and the charging control circuit 14 may be interrupted.

Figure 8:
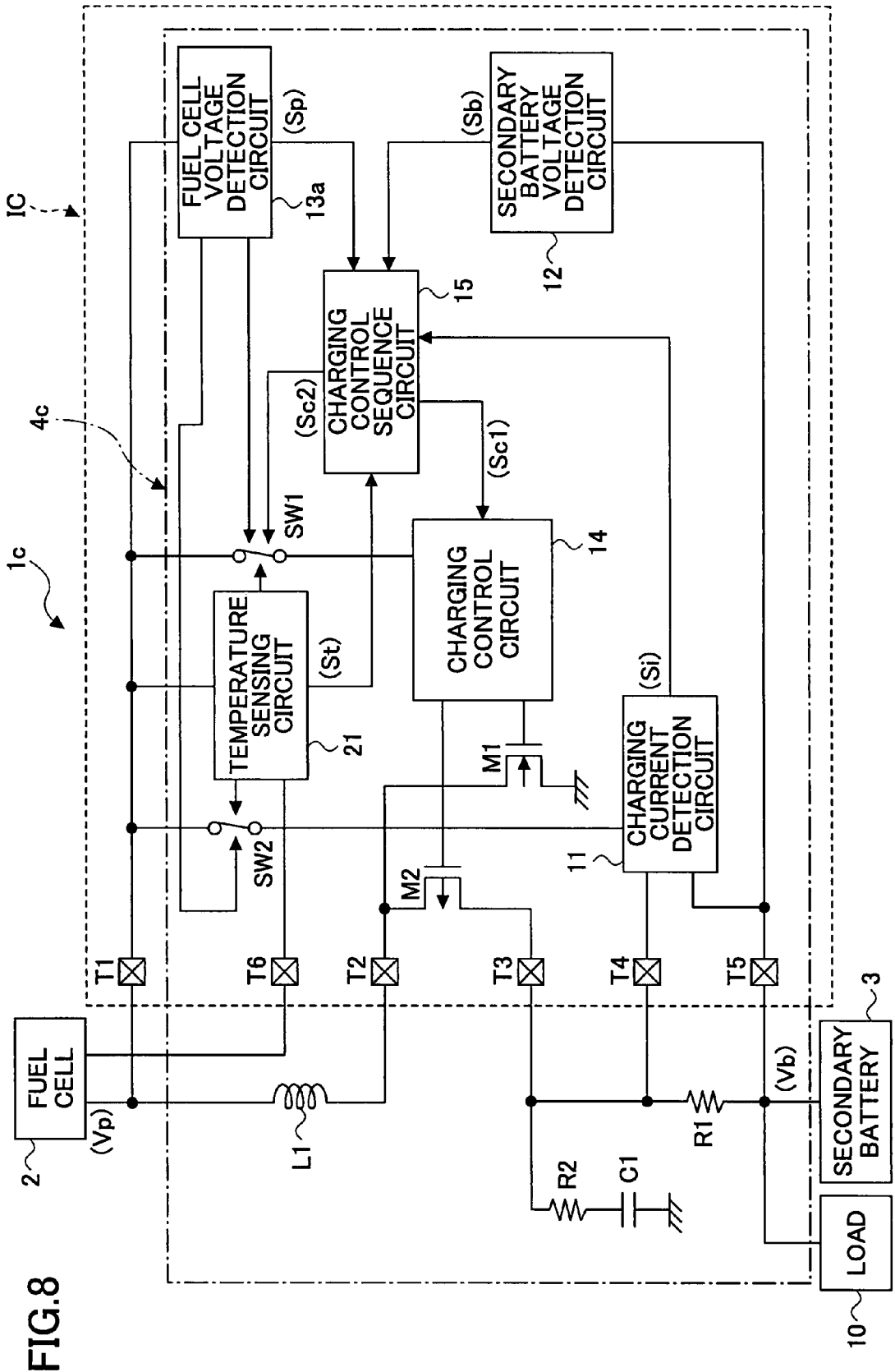
FIG. 8 is a block diagram showing a configuration example of a power supply unit having a charging circuit according to a fourth embodiment of the present invention.

FIG. 8 is a block diagram showing a configuration example of a power supply unit having a charging circuit according to the fourth embodiment of the present invention. In FIG. 8, components the same as or similar to those of FIG. 6 are indicated by the same numerals and will not be described below. Here, only parts different from FIG. 6 will be described.

FIG. 8 is different from FIG. 6 in that the fuel cell voltage detection circuit 13 of FIG. 6 is replaced by the fuel cell voltage detection circuit 13a of FIG. 4 and the switching control of the first switch SW1 and the second switch SW2 is performed depending on the fuel cell voltage Vp. Accordingly, the charging circuit 4b and the power supply unit 1b of FIG. 1 are denoted as a charging circuit 4c and a power supply unit 1c, respectively.

In FIG. 8, the power supply unit 1c includes the fuel cell 2, the secondary battery 3, and the charging circuit 4c which charges the secondary battery 3 with the voltage obtained by boosting the fuel cell voltage Vp.

The charging circuit 4c includes the switching element M1, the switching element M2 for synchronous rectification, the inductor L1, the capacitor C1, the resistances R1 and R2, the first switch SW1, the second switch SW2, the charging current detection circuit 11, the secondary battery voltage detection circuit 12, the fuel cell voltage detection circuit 13a, the charging control circuit 14, the charging control sequence circuit 15, and the temperature sensing circuit 21. The switching element M1, the switching element M2 for synchronous rectification, the first switch SW1, the second switch SW2, the charging current detection circuit 11, the secondary battery voltage detection circuit 12, the fuel cell voltage detection circuit 13a, the charging control circuit 14, the charging control sequence circuit 15, and the temperature sensing circuit 21 are integrated into one IC, and the IC includes the terminals T1 through T6.

The fuel cell voltage Vp input to the terminal T1 is input to the charging current detection circuit 11 as a power supply through the second switch SW2 and simultaneously input to the fuel cell voltage detection circuit 13a. The charging current detection circuit 11 is supplied with power from the fuel cell 2 through the second switch SW2, and the switching control of the second switch SW2 is performed by the fuel cell voltage detection circuit 13a and the temperature sensing circuit 21. Further, since the fuel cell voltage detection circuit 13a and the temperature sensing circuit 21 also perform the switching control of the first switch SW1, the switching control of the first switch SW1 is performed by the charging control sequence circuit 15 and the temperature sensing circuit 21.

With such a configuration, the fuel cell voltage detection circuit 13a detects the voltage value of the fuel cell voltage Vp. When the fuel cell voltage Vp has dropped to less than the specified voltage Va to be unable to obtain the current necessary for charging the secondary battery 3, the fuel cell voltage detection circuit 13a performs the operation of the second low consumption current mode in which the first switch SW1 and the second switch SW2 are each turned off to cut off electrical connections, whereby the power supply to the charging current detection circuit 11 and the charging control circuit 14 is stopped. Further, when the fuel cell voltage Vp has become greater than or equal to the specified voltage value Va, the fuel cell voltage detection circuit 13a turns on each of the first switch SW1 and the second switch SW2 to create electrical connections, whereby power is supplied to the charging current detection circuit 11 and the charging control circuit 14 to cancel the operation of the second low consumption current mode.

The temperature sensing circuit 21 senses the temperature of the fuel cell 2. When the temperature of the fuel cell 2 has risen above the predetermined value Ta, the temperature sensing circuit 21 performs the operation of the second low consumption current mode in which the first switch SW1 and the second switch SW2 are each turned off to cut off electrical connections, whereby the power supply to the charging current detection circuit 11 and the charging control circuit 14 is stopped. Further, when the temperature of the fuel cell 2 has become less than the predetermined value Ta, the temperature sensing circuit 21 turns on each of the first switch SW1 and the second switch SW2 to create electrical connections, whereby power is supplied to the charging current detection circuit 11 and the charging control circuit 14 to cancel the operation of the second low consumption current mode.

In the first low consumption current mode and the second low consumption current mode, for example, when the charging control circuit 14 is configured to control a charging current with a switching converter, an error amplification circuit, an oscillation circuit, a reference voltage source circuit, or the like constituting the charging control circuit 14, each stops the operation. Further, although the power supply line is omitted in FIG. 8, the secondary battery voltage detection circuit 12 and the charging control sequence circuit 15 are supplied with power at all times to operate. The secondary battery voltage detection circuit 12, the fuel cell voltage detection circuit 13a, and the temperature sensing circuit 21 are caused to operate at all times. Therefore, when the secondary battery 3 is discharged so as to reduce the secondary voltage Vb, the charging control sequence circuit 15 turns on the first switch SW1 to create an electrical connection and is capable of charging the secondary battery 3 by starting the charging control circuit 14 which has been suspended. When the fuel cell voltage Vp has become greater than or equal to the specified voltage value Va and simultaneously the temperature of the fuel cell 2 has become less than the predetermined value Ta, the fuel cell voltage detection circuit 13a and the temperature sensing circuit 21 turn on each of the first switch SW1 and the second switch SW2 to create electrical connections and are capable of charging the secondary battery 3 by starting charging current detection circuit 11 and the charging control circuit 14 which have been suspended.

Figure 9:
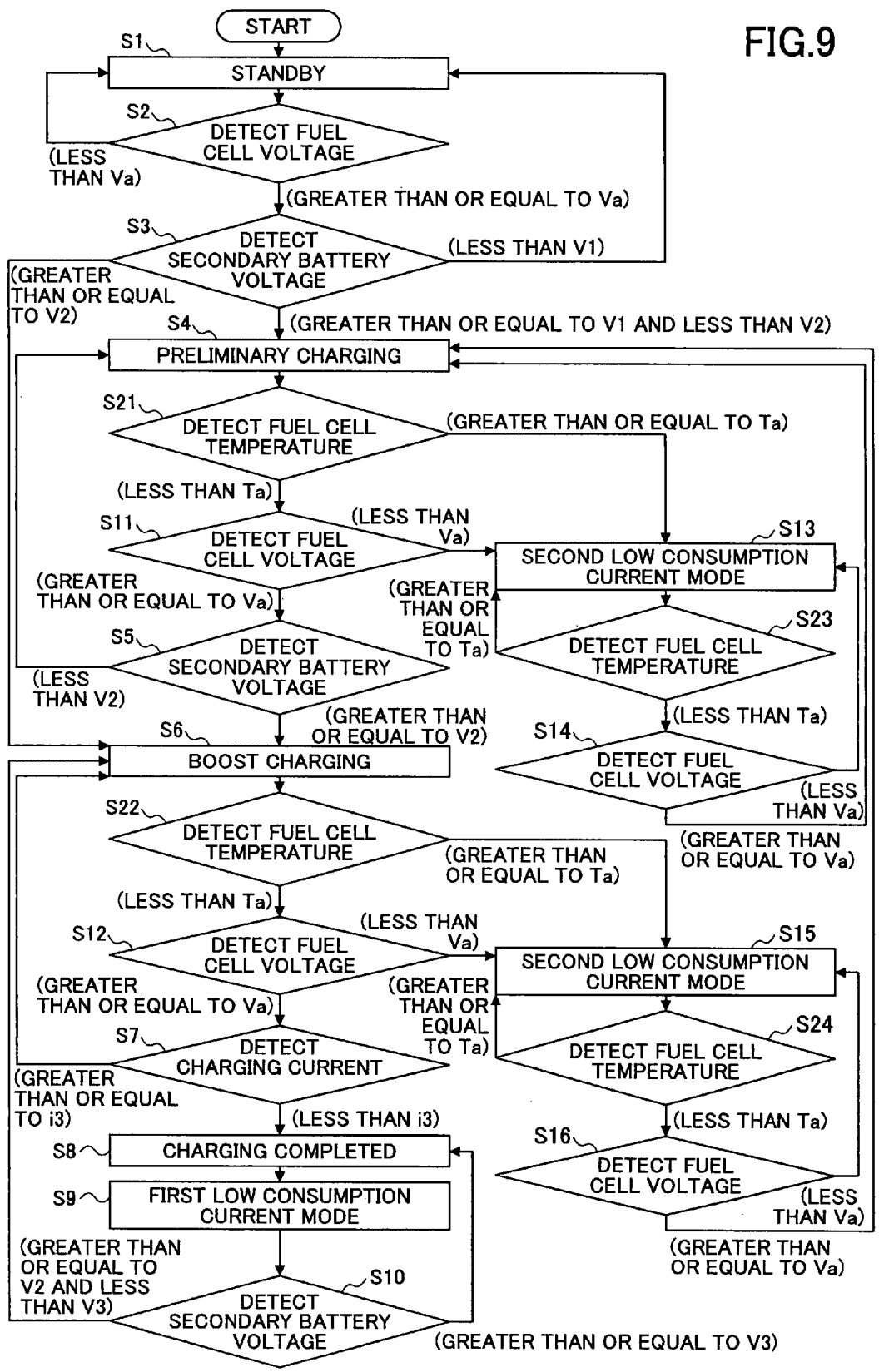
FIG. 9 is a flowchart showing an operations example of the charging circuit 4c of FIG. 8.

FIG. 9 is a flowchart showing an operations example of the charging circuit 4c of FIG. 8. Referring now to FIG. 9, a description will be made an operations flow of the charging circuit 4c. In FIG. 9, flows the same as or similar to those of FIG. 5 or FIG. 7 are indicated by the same numerals and will not be described below. Here, only parts different from FIG. 7 will be described.

FIG. 9 is different from FIG. 7 in that the processes of steps S11, S12, S14, and S16 of FIG. 5 are added between steps S21 and S5, steps S22 and S7, steps S23 and S4, and step S24 and S4 of FIG. 7, respectively.

In FIG. 9, when the temperature of the fuel cell 2 has become less than the predetermined value Ta in step S21, the process proceeds to step S11. The fuel cell voltage detection circuit 13a detects the fuel cell voltage Vp all the time during the preliminary charging of step S4 (step S11). When the fuel cell voltage Vp has become greater than or equal to the specified voltage value Va, the fuel cell voltage detection circuit 13a proceeds to step S5. When the fuel cell voltage Vp has become less than the specified voltage value Va, the fuel cell voltage detection circuit 13a proceeds to step S13. Further, in step S22, when the temperature of the fuel cell 2 has become less than the predetermined value Ta, the process proceeds to step S12. The fuel cell voltage detection circuit 13a detects the fuel cell voltage Vp all the time during the boost charging of step S6 (step S12). When the fuel cell voltage Vp has become greater than or equal to the specified voltage value Va, the fuel cell voltage detection circuit 13a proceeds to step S7. Further, in step S12, when the fuel cell voltage Vp has become less than the specified voltage value Va, the process proceeds to step S15.

Further, in step S23, when the temperature of the fuel cell 2 has become less than the predetermined value Ta, the process proceeds to step S14. Even in the second low consumption current mode of step S13, the fuel cell voltage detection circuit 13a detects the fuel cell voltage Vp all the time (step S14). When the fuel cell voltage Vp has become greater than or equal to the specified voltage value Va, the fuel cell voltage detection circuit 13a returns to step S4. When the fuel cell voltage Vp has become less than the specified voltage value Va in step S14, the fuel cell voltage detection circuit 13a returns to step S13. Further, in step S24, when the temperature of the fuel cell 2 has become less than the predetermined value Ta, the process proceeds to step S16. Even in the second low consumption current mode of step S15, the fuel cell voltage detection circuit 13a detects the fuel cell voltage Vp all the time (step S16). When the fuel cell voltage Vp has become greater than or equal to the specified voltage value Va, the fuel cell voltage detection circuit 13a returns to step S4. Further, in step S16, when the fuel cell voltage Vp has become less than the specified voltage value Va, the fuel cell voltage detection circuit 13a returns to step S15.

Although FIG. 8 shows a case in which the secondary battery 3 is charged with the voltage obtained by boosting the fuel cell voltage Vp, it may be charged with the voltage obtained by reducing the fuel cell voltage Vp. In this case, since the switching element M1, the switching element M2 for synchronous rectification, and the inductor L1 of FIG. 8 are similar to those of FIG. 3, the description thereof is omitted.

As described above, when the fuel cell voltage Vp has become less than the specified voltage value Va to be unable to charge the secondary battery 3 and/or when the temperature of the fuel cell 2 has become greater than or equal to the predetermined value Ta, the charging circuit of the secondary battery according to the fourth embodiment turns off each of the first switch SW1 and the second switch SW2 to interrupt the power supply to the charging current detection circuit 11 and the charging control circuit 14. When the charging of the secondary battery 3 is completed, the first switch SW1 is turned off to interrupt the power supply to the charging control circuit 14. Therefore, it is possible to obtain the effects of the second and the third embodiments. As a result, power efficiency can furthermore be improved.

Note that although the first through fourth embodiments exemplify the case in which the secondary battery 3 is a lithium-ion battery, they are merely examples. Alternatively, an electric double layer capacitor or the like may be used as the secondary battery 3. Further, each of the first through fourth embodiments exemplifies the case in which either a circuit configuration to boost the fuel cell voltage Vp or that to reduce the same is adopted. Alternatively, there may be adopted a boosting/reducing circuit configuration for boosting and reducing the fuel cell voltage Vp.

The present invention is not limited to the specifically disclosed embodiments, and variations and modifications may be made without departing from the scope of the present invention.

The present application is based on Japanese Priority Patent Application No. 2006-157435, filed on Jun. 6, 2006, the entire contents of which are hereby incorporated by reference.

What is claimed is:

1. A charging circuit which charges a secondary battery using a fuel cell as a power supply, comprising:
a charging current supply circuit unit which supplies a charging current to the secondary battery using the fuel cell as the power supply depending on an input control signal;
a charging current detection circuit unit which detects the charging current value output from the charging current supply circuit generates and outputs a signal indicative of the detected charging current values;
a secondary battery voltage detection circuit unit which detects the voltage of the secondary battery, and generates and outputs a signal indicative of the voltage value of the detected secondary battery voltage; and
a charging control circuit unit which performs on the charging current supply circuit unit either constant-current charging for outputting a predetermined charging current or constant-voltage charging for outputting a charging current so that the secondary battery voltage becomes constant at a predetermined value, based on the respective output signals output from the charging current detection circuit unit and the battery voltage detection circuit unit;
wherein, when the charging control circuit unit determines from the output signal output from the charging current detection circuit unit that the secondary battery has been completed, it interrupts the power supply to an internal circuit which controls the operation of the charging current supply circuit unit,
wherein the charging control circuit unit includes: a charging control circuit which serves as the internal circuit and performs on the secondary battery either the constant-current charging or the constant-voltage charging current supply circuit unit depending on the input control signal; a first switch circuit which performs the control of the power supply to the charging control circuit depending on the input control signal: and a control circuit which performs the control of the operation of the charging control circuit and the first switch circuit based on the respective output signals output from the charging current detection circuit unit and the secondary battery voltage detection circuit unit; wherein, when the control circuit detects from the output signal output from the charging current detection circuit unit that the charging current value has become less than a predetermined charging completion current value, it determines that charging of the secondary battery has been completed, and causes the first switch circuit to interrupt a power supply to the charging control circuit,
wherein the charging circuit further comprises: the fuel cell voltage detection circuit unit which detects the fuel cell voltage as a voltage of the fuel cell; and a second switch circuit which performs the control of the power supply to the charging current detection circuit unit depending on a second input control signal; wherein, when the fuel cell voltage detection circuit unit detects that the fuel cell voltage has become less than a predetermined specified voltage value, it causes the first switch circuit to interrupt the power supply to the charging control circuit and the second switch circuit to interrupt the power supply to the charging current detection circuit unit.

2. The charging circuit according to claim 1, wherein, when the fuel cell voltage detection circuit unit detects that the fuel cell voltage has become greater than or equal to the specified voltage value, it causes the first switch circuit to perform the power supply to the charging control circuit and the second switch circuit to perform the power supply to the charging current detection circuit unit.

3. The charging circuit according to claim 1, further comprising a temperature sensing circuit unit which senses the temperature of the fuel cell, wherein, when the temperature sensing circuit unit senses that the temperature of the fuel cell has become greater than or equal to a predetermined value, it causes the first switch circuit to interrupt the power supply to the charging control circuit and the second switch circuit to interrupt the power supply to the charging current detection circuit unit.

4. A charging circuit which charges a secondary battery using a fuel cell as a power supply, comprising:
   a charging current supply circuit unit which supplies a charging current to the secondary battery using the fuel cell as the power supply depending on an input control signal;
   a charging current detection circuit unit which detects the charging current value output from the charging current supply circuit unit, and generates and outputs a signal indicative of the detected charging current value;
   a secondary battery voltage detection circuit unit which detects the voltage of the secondary battery, and generates and outputs a signal indicative of the voltage value of the detected secondary battery voltage; and
   a charging control circuit unit which performs on the charging current supply circuit unit either constant-current charging for outputting a predetermined charging current or constant-voltage charging for outputting a charging current so that the secondary battery voltage becomes constant at a predetermined value, based on the respective output signals output from the charging current detection circuit unit and the secondary battery voltage detection circuit unit;
   wherein, when the charging control circuit unit determines from the output signal output from the charging current detection circuit unit that the charging of the secondary battery has been complete, it interrupts the power supply to an internal circuit which controls the operation of the charging current supply circuit unit,
   wherein the charging control circuit unit includes: a charging control circuit which serves as the internal circuit and performs on the secondary battery either the constant-current charging or the constant-voltage charging using the charging current supply circuit unit depending on the input control signal; a first switch circuit which performs the control of a power supply to the charging control circuit depending on an input control signal; and a control circuit which performs the control of the operation of the charging control circuit and the first switch circuit based on the respective output signals output from the charging current detection circuit unit and the secondary battery voltage detection circuit unit;
   wherein, when the control circuit detects from the output signal output from the charging current detection circuit unit that the charging current value has become less than a predetermined charging completion current value, it determines that charging of the secondary battery been completed, and causes the first switch circuit to interrupt a power supply to the charging control circuit,
   wherein the charging circuit further comprises: a temperature sensing circuit unit which senses the temperature of the fuel cell; and a second switch circuit which controls the power supply to the charging current detection circuit unit depending on a second input control signal; wherein, when the temperature sensing circuit unit senses that the temperature of the fuel cell has become greater than or equal to a predetermined value, it causes the first switch to interrupt the power supply to the charging control circuit and the second switch circuit to interrupt the power supply to the charging current detection circuit unit.

5. The charging circuit according to claim 4, wherein, when the temperature sensing circuit unit senses that the temperature of the fuel cell has become less than the predetermined value, it causes the first switch circuit to connect the power supply to the charging control circuit and the second switch circuit to connect the power supply to the charging current detection circuit unit.

* * * * *